June 7, 1955  W. L. PENTKOWSKI  2,710,075
VEHICLE BRAKE STRUCTURE
Filed March 18, 1950
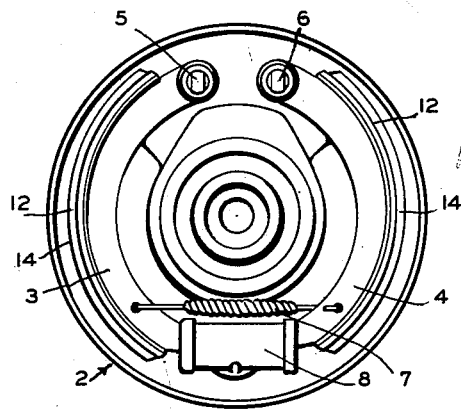
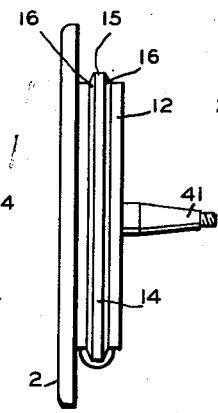
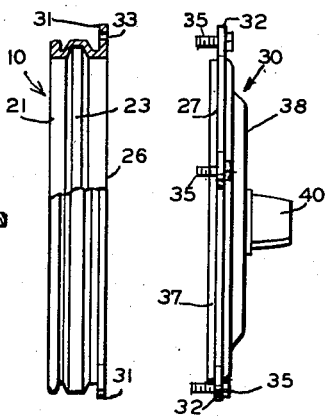
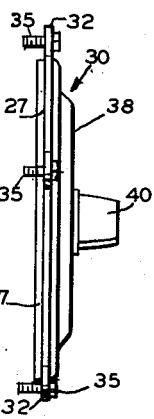
FIG.1　　FIG.2　　FIG.3　　FIG.4
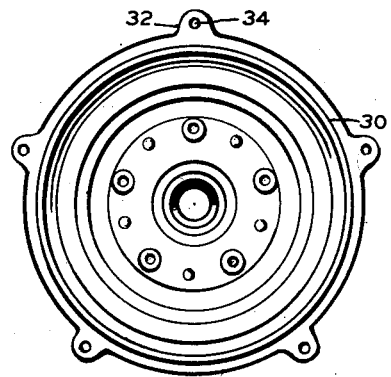
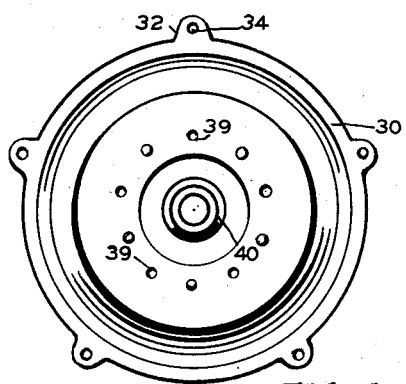
FIG.5　　FIG.6
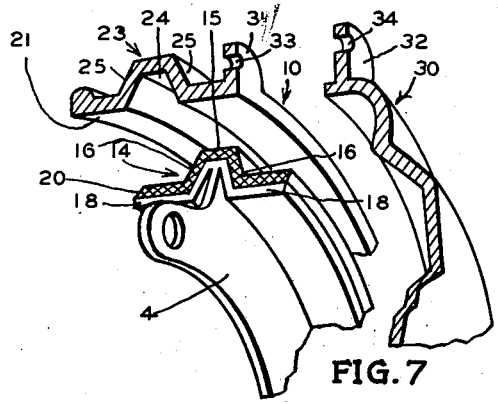
FIG.7
Inventor
WALTER L. PENTKOWSKI
By Scott L. Norwiel
Attorney

United States Patent Office 2,710,075
Patented June 7, 1955

2,710,075

VEHICLE BRAKE STRUCTURE

Walter L. Pentkowski, Phoenix, Ariz.

Application March 18, 1950, Serial No. 150,479

3 Claims. (Cl. 188—78)

This invention ralates to vehicle brakes.

One of the objects is to provide a brake having a drum and shoe of greater frictional braking area and better cooling than those now in common use without increasing the over-all size of the brake;

Another object is to provide a brake drum and brake shoes operative therein, having annular grooves and ridge, respectively, which increases the frictional area of the braking surface without increasing the width or diameter to any appreciable extent;

Another object is to provide a vehicle brake including a drum, having an annular groove formed in its inner surface, together with brake shoes mounted on an axle flange, having arcuate ribs on their outer surfaces adapted to engage in said drum on a vehicle wheel so that the drum may be easily disassembled to make possible the removal of the brake shoes from said axle flange outward through said drum;

A still further object is to provide a grooved brake drum, used with ribbed brake shoes, with a friction ring portion and an easily removable outer disk portion adapted to be attached to the inner face of a vehicle wheel by means of the commonly used bolts, or screws; said parts being arranged so that removal of said outer disk gives access to said brake shoes enabling them to be removed outward through said ring portion.

Further objects will appear hereinafter.

I attain the foregoing objects by means of the devices and the particular construction and arrangement of parts shown in the accompanying drawing in which—

Figure 1 is an end elevation of an axle flange equipped with ribbed brake shoes of the type adapted to engage my improved brake drum;

Figure 2 is a side elevation thereof;

Figure 3 is a side elevation of the ring portion of my improved brake drum;

Figure 4 is a side elevation of the outer disk portion of my improved brake drum;

Figure 5 is an elevational view of the inner face of the disk portion of my brake drum;

Figure 6 is an elevation view of the outer face of said disk portion; and

Figure 7 is an expanded perspective view of fragments of said drum and one shoe, said drum portions being sectioned on a radial plane, and all parts drawn on an enlarged scale.

Similar numerals of reference connote similar parts in the several views.

In the drawing 2 indicates an axle housing outer end flange of standard design. On this there are two brake shoes 3 and 4 pivoted on bosses 5 and 6 at the top ends also in a conventional manner. These shoes are resiliently drawn together, inwardly by a spring 7 disposed near their bottom ends, and may be forced outward, to effect engagement with brake drum ring 10, by hydraulic pressure applied to cylinder 8. The outer arcuate surfaces 12 of these shoes have arcuate ribs 14 having a sectional shape shown particularly in Figure 7. These ribs have for their mid-portion a semi-cylindrical outer surface 15, sides 16 slant axially outward from the edges of this mid-portion and join semi-cylindrical outer portions 18 of the shoe. The ribs, therefore, have a generally wedge-shaped section. All outer surfaces of the ribs, as well as the outer portions 18 adjoining each of their sides, are covered with brake lining material 20, as shown in Figure 7.

The brake drum ring 10 has a section shaped to provide an inner annular braking surface 21 conforming to the outer surfaces 12 of the shoes 3 and 4. This inner surface includes particularly an annular groove 23 having a bottom 24 and sides 25 formed to mate the size and shape of the ribs 14. The outer face 26 of ring 10 is tooled flat and adapted to receive the inner face 27 of brake drum disk 30. The adjacent peripheral edges of rim 10 and disk 30 have ears 31 and 32, respectively, in mating relation and these have registering holes 33 and 34 adapted to admit bolts 35 in order to secure the disk on the outer face of the rim.

The inner face of disk 30 has an annular lip 37 adapted to engage the inner face edge of the ring to maintain its position. The outer face 38 of this disc has the usual wheel mounting means which may include threaded holes 39 adapted to receive wheel holding cap screws, also bearing boss 40 which is adapted to receive axle spindle 41 in any conventional manner.

Figures 3 and 4 may be considered together as an expanded view of the drum. In use these parts are bolted together and take the place of the conventional cup shaped drum.

In mounting this type of braking mechanism, the shoe 3 is first installed on flange 2. Drum ring 10 is then placed in position over this shoe. Shoe 4 is then fitted on to stud 6 after being swung inwardly while the ring was positioned in shoe 3, This procedure must be followed because the ribs 14 extend outward a considerable distance and the shoes must be compressed inwardly a great deal more in fitting new shoes than in releasing braking engagement after they are installed. After the rim is properly positioned and both shoes are in place, disk 30 is attached to ring 10 by bolts 35 using nuts and lockwashers, or the like. The wheel bearing, if any, is then locked onto the axle spindle 41. Thereafter the wheel may be attached in the usual manner.

I claim:

1. In a vehicle including a one-piece ring-shaped brake drum, an annular ridge on the exterior surface of said brake drum, a cylindrical internal braking surface in said brake drum, a pair of brake shoes having arcuate outer cylindrical surfaces engaging said cylindrical braking surface on said brake drum, a V-shaped annular groove having outwardly converging sides and a cylindrical bottom surface formed in said cylindrical braking surface of said brake drum and extending into said annular ridge, arcuate V-shaped ribs on said brake shoes for frictional engagement with the sides and bottom surfaces of said groove, and means for removing the brake shoes axially outwardly through the brake drum including, a plate closing one side of and removably secured to the brake drum, and means for securing a vehicle wheel to said plate.

2. In a vehicle brake including an axle housing spindle, an axle housing outer end flange, a one-piece ring-shaped brake drum, a cylindrical internal braking surface in said brake drum, a pair of brake shoes mounted on an axle housing outer end flange having arcuate outer cylindrical surfaces engaging said cylindrical braking surface on said brake drum, a V-shaped annular groove having outwardly converging sides and a cylindrical bottom surface formed in said cylindrical braking surface of said brake drum, arcuate V-shaped ribs on said brake shoes for frictional engagement with the sides and bottom surfaces of said groove, ears fixed on the outer periphery of said brake drum adjacent the outer face thereof, a brake drum disk having an inner face adapted to engage said outer face of said brake drum, means on said brake drum disc to mount said disc on the axle spindle, ears fixed on the outer periphery of said brake drum disc in mating relation to the ears on said brake drum, bolts passing through and clamping up said ears, and wheel mounting means carried on said brake drum disc.

3. In a vehicle brake, an axle housing spindle, an axle housing outer end flange secured to said axle housing spindle, a one-piece ring-shaped brake drum, spaced internal cylindrical braking surfaces in said brake drum, a pair of brake shoes, bosses for mounting said brake shoes on said axle housing outer end flange for swinging movement in a plane perpendicular to the axis of brake drum rotation, a fluid pressure cylinder mounted on said axle housing outer end flange connected to actuate said brake shoes, spaced arcuate outer cylindrical surfaces engaging said spaced internal cylindrical surfaces in said brake drum, a V-shaped annular groove between said spaced internal cylindrical surfaces having outwardly converging sides, and a cylindrical bottom surface in said brake drum, arcuate V-shaped ribs on said brake shoes for frictional engagement with the sides and bottom surfaces of said groove, ears fixed on the outer periphery of said brake drum adjacent the outer face thereof, a brake drum disc having an inner face adapted to engage said outer face of said brake drum, ears on the periphery of said brake drum disc arranged in mating relationship to the ears on said brake drum, means for clamping said ears together, and means for mounting a wheel on said brake drum disc.

References Cited in the file of this patent
UNITED STATES PATENTS

| Number | Name | Date |
|---|---|---|
| 935,466 | Cummings | Sept. 28, 1909 |
| 1,320,669 | Auger | Nov. 4, 1919 |
| 1,767,522 | Evans | June 24, 1930 |
| 1,785,424 | Pugh | Dec. 16, 1930 |
| 2,041,935 | Kliewer | May 26, 1936 |
| 2,135,666 | Hunt | Nov. 8, 1938 |
| 2,268,605 | Mattersdorf | Jan. 6, 1942 |
| 2,582,755 | Kenny | Jan. 15, 1952 |

FOREIGN PATENTS

| Number | Country | Date |
|---|---|---|
| 783,076 | France | Apr. 1, 1935 |